Patented Apr. 5, 1932

1,852,110

UNITED STATES PATENT OFFICE

LUDWIG J. CHRISTMANN, OF JERSEY CITY, AND DAVID W. JAYNE, JR., OF ELIZABETH, NEW JERSEY, ASSIGNORS TO AMERICAN CYANAMID COMPANY, OF NEW YORK, N. Y., A CORPORATION OF MAINE

METHOD OF MAKING XANTHATES

No Drawing. Application filed May 15, 1930. Serial No. 452,813.

This invention relates to xanthates, more particularly to a general method of making sodium or potassium or other xanthates.

In the manufacture of xanthates it has been customary to provide a mixture of the reacting ingredients, such as carbon bi-sulphide, ethyl alcohol, caustic potash and water, stirring the mixture with cooling to prevent an undue rise of temperature. The resulting product was a thick slurry of the xanthate which was centrifuged or filtered and washed with gasoline. Such a procedure was relatively expensive. The method was also disadvantageous in that certain xanthates could not be produced thereby, particularly some of the xanthates made with caustic soda, for the reason that such xanthates had a tendency to decompose under the influence of water and of heat, and therefore, the yield was low, and decomposition took place on standing.

The present invention provides a method of making xanthates such that the xanthates are finally produced in a dry condition and do not require any removal of water. The process is based upon the idea that xanthate crystallizes from water solution with water of crystallization which, in most cases, is probably two molecules of water for each molecule of xanthate. Therefore, if during the reaction which forms the xanthate only so much water is added as will appear combined in the final product as water of crystallization, then a substantially dry xanthate may be produced directly. Generally the reacting ingredients appear in equimolecular proportions, thus providing one molecule of water for each molecule of xanthate to be formed, a second molecule of water being produced by the reaction and the two molecules of water thus provided combine with the xanthate as water of crystallization.

The reaction may be carried out in various manners, it being highly desirable that the reaction, which liberates a considerable amount of heat, be so conducted as to prevent too rapid a reaction. This may be accomplished by first making a mixture of some of the substances entering the reaction and adding to the mixture the other ingredients slowly and with stirring. For example, a mixture is made of alcohol, sodium hydroxide and water, in equimolecular proportions and to this mixture is added slowly with stirring one molecular proportion of carbon bi-sulphide. Or a mixture may be made of the carbon bi-sulphide and solid sodium hydroxide into which a mixture of alcohol and water is dropped with stirring.

Another procedure consists in making a mixture of carbon bi-sulphide, water and sodium hydroxide, and adding thereto the alcohol. In still another procedure a mixture is made of carbon bi-sulphide, alcohol and part of the sodium hydroxide. Into this is dropped a solution of the remainder of the sodium hydroxide in water.

By the above procedures we have produced various xanthates in the dry state directly, avoiding the necessity for removal of any water and the following are examples of mixtures which have produced xanthates, the structural formulae of which are given opposite the mixtures. The numerals indicate parts by weight.

I  230 ethyl alcohol ($C_2H_5OH$)
   380 $CS_2$
   200 NaOH
   90 $H_2O$ $$\begin{array}{c} CH_3CH_2 \\ | \\ O \\ | \\ S=C-SNa \end{array} \cdot 2H_2O$$

II  300 Isopropyl alcohol $\begin{array}{c} CH_3 \\ CH_3 \end{array}\!\!>\!\!CHOH$
    280 $CS_2$
    200 NaOH
    90 $H_2O$ $$\begin{array}{c} H \\ | \\ CH_3-C-CH_3 \\ | \\ O \\ | \\ S=C-SNa \end{array} \cdot 2H_2O$$

III  300 n. propyl alcohol ($CH_3CH_2CH_2OH$)
     380 $CS_2$
     200 NaOH
     90 $H_2O$ $$\begin{array}{c} CH_3CH_2CH_2-O \\ | \\ S=C-SNa \end{array} \cdot 2H_2O$$

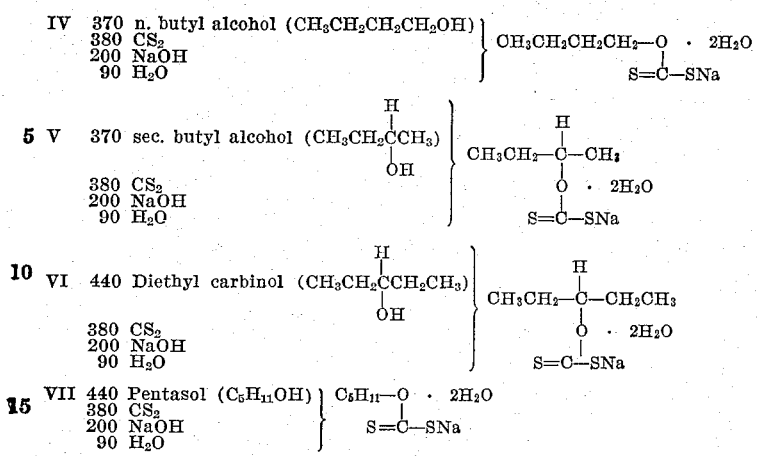

The yield of xanthate in every case is excellent and the product is of a high degree of purity of the salt. The water of crystallization may be driven off by heat, but the hydrated salts are perfectly stable for long periods of time.

What we claim is:

A method of making xanthates which comprises providing a mixture of approximately equimolecular proportions of an aliphatic, mono-hydric alcohol, carbon bi-sulphide, caustic alkali and water, and causing a reaction to take place to form a xanthate.

In witness whereof, we have hereinto subscribed our names this 10th day of May, 1930.

LUDWIG J. CHRISTMANN.
DAVID W. JAYNE, Jr.